United States Patent [19]
Motozato

[11] Patent Number: 4,882,426
[45] Date of Patent: Nov. 21, 1989

[54] BEADS OF CROSS-LINKED GLUCOMANNAN AND PRODUCTION THEREOF

[75] Inventor: Yoshiaki Motozato, Kumamoto, Japan

[73] Assignee: Kurita Water Industries, Ltd., Tokyo, Japan

[21] Appl. No.: 70,950

[22] Filed: Jul. 8, 1987

[51] Int. Cl.$^4$ .................. A61K 29/02; C09K 3/00
[52] U.S. Cl. ................................ 536/114; 536/126
[58] Field of Search ............... 527/300, 301; 536/114, 536/126

[56] References Cited

U.S. PATENT DOCUMENTS

| | | | |
|---|---|---|---|
| 3,265,631 | 8/1966 | Jordan | 536/114 |
| 4,115,536 | 9/1978 | Rothman et al. | 424/9 |
| 4,124,705 | 11/1978 | Rothman et al. | 536/120 |
| 4,514,309 | 4/1985 | Wadhwa | 524/44 |

OTHER PUBLICATIONS

Journal of Chromatography, vol. 355, No. 2, Mar. 21st, 1986, pp. 434-437, Elsevier Science Publishers B.V., Amsterdam, NL; Y. Motozato et al, "Preparation and gel permeation chromatographic properties of pullulan spheres".

Polymer Preprints, Japan, vol. 36, No. 3, 1987, p. 876; Y. Motozato et al, "Macroporous glucomannan spheres for the size separation of aqueous macromolecules".

Patent Abstracts of Japan, vol. 6, No. 139 (C-116)[1017], Jul. 28th, 1982; & JP-A-57 63303 (Yoshiaki Motozato) 16-04-1982.

Patent Abstracts of Japan, vol. 6, No. 180 (C-125)[1058], Sep. 14th 1982; & JP-A-57 98506 (Yoshiaki Motozato) 18-06-1982.

Primary Examiner—John Kight
Assistant Examiner—Nathan M. Nutter
Attorney, Agent, or Firm—Flynn, Thiel, Boutell & Tanis

[57] ABSTRACT

Beads product of Glucomannan having a cross-linked structure and exhibiting a degree of swelling of in the range from 1.5 to 15, an exclusion limit molecular weight in the range from 200 to 100,000,000 and an average bead diameter in the range from 1 to 500 μm. The glucomannan beads are useful for packing material for gel filtration and for gel chromatography. They can be produced by a process which comprises preparing a starting process solution by dissolving an esterified glucomannan solely or together with a diluent in a solvent, introducing this starting process solution into an aqueous medium so as to cause formation of liquid droplets of the starting process solution suspended in said aqueous medium, evaporating off the solvent contained in the liquid droplets to leave spherical beads of the glucomannan ester, saponifying the so formed beads of glucomannan ester to convert into beads of glucomannan and effecting then cross linking of the saponified beads by reacting with a cross linking agent.

11 Claims, 1 Drawing Sheet

Fig. 1

BEADS OF CROSS-LINKED GLUCOMANNAN AND PRODUCTION THEREOF

BACKGROUND OF THE INVENTION

1. Field of the Invention

The present invention relates to spherical beads of cross-linked glucomannan, in particular, those which are useful, for example, as packing material in the techniques of gel filtration and gel chromatography, and to a process for their production.

2. Description of the Prior Art

For isolation or fractionation of substances by making use of the difference in the molecular size, techniques have been developed in, for example, so-called gel filtration and gel chromatography. The gel filtration and gel chromatography employ as the packing material gelled particles of hydrophilic or hydrophobic nature and there have been in practical use, for example, beads of such materials as dextran, agarose, cellulose, polyvinyl alcohol, polyacrylamide and polystyrene.

Important properties for the packing material for gel filtration and gel chromatography are the stability against pressure in water, namely, the strength to maintain spherical shape of beads, and the capability of voluntary selection of the exclusion limit molecular weight, namely the upper permissible limit of molecular weight of solute to penetrate through the beads, among wide distribution range thereof. Such properties are important for isolating the objective substance in a form as pure as possible among those which have moleculr weights distributed over a wide range and for maintaining a uniform packing condition without suffering from destruction or deformation of the beads.

The conventional gel beads of hydrophobic or hydrophobic nature found in practical use as mentioned above are not only difficult to obtain in the form of fine particles of true spherical shape, but also are inferior in the strength, besides the shortcoming that it is difficult to attain adjustment of the exclusion limit molecular weight over a wide range.

In the magazine "Nippon Kagakukaishi" No. 5, p. 732 (1984), there is a report for "Hydrophilic Gels from Mannan Grafted by Vinyl Acetate as Gel Chromatographic Packings". Here, it is reported that "graft copolymers, which contain 54, 71 and 84 mole % of pendant poly(vinyl acetate) and whose degree of polymerisation was about 2,000, were synthesized by grafting vinyl acetate to mannan granules which contained an aqueous solution of potassium peroxodisulfate. Beads of acetylated graft copolymer were prepared by suspending a solution of acetylated graft copolymer in dichloromethane in an aqueous medium. Then, beads of mannan-poly(vinyl alcohol) graft copolymer were prepared from the beads of acetylated graft copolymer by saponification and subsequent cross linking". In the hydrophobic gel obtained herein however, "highly hydrophilic micro mannan gel phases exist in the poly-(vinyl alcohol) gel matrix". Thus, they are not quite excellent for the packing material for gel filtration etc.

There were reported in the magazine "Polymer Preprints, Japan", Vol. 36, No. 3, 876 (1987). 1 that glucomannan beads suitable for aq. base GPC were prepared by forming micro beads of triacetyl glucomannan by suspension evaporation, saponifying them in heterogeneous phase and cross-linking them with epichlorohydrin, 2 that glucomannan beads having exclusion limit molecular weights in the range of $10^2$–$10^7$ or more were able to be obtained by regulating the condition of the cross-linking reaction and selecting the diluent and its concentration during the formation of beads and 3 that this gel exhibited quite lower swellability than conventional hydrophilic gel.

In this report, however, the method of preparation of gel is given only conceptionally and it is not guaranteed that a superior gel product is always obtained. The material properties of the gel are not clear.

BRIEF SUMMARY OF THE INVENTION

The object of the present invention is to solve the problems existing in the prior art as suggested above.

Another object of the present invention is to provide a bead product of mannan having a cross-linked structure which is superior in the fastness to compression and is capable of having the exclusion limit molecular weight thereof voluntarily adjusted over a wide range.

The spherical beads of glucomannan having cross-linked structure according to the present invention exhibit a degree of swellling of 1.5–15, preferably 2 to 8, expressed in terms of number of ml of wet gel bed per g of dry gel, an exclusion limit molecular weight in the range from 200 to 100,000,000 and preferably at least 1,000,000, an average bead size of 1–500 μm and a matrix volume proportion of at least 15% at an exclusion limit molecular weight of about 1,000,000.

The spherical beads of glucomannan having cross-linked structure according to the present invention are obtainable by preparing first a starting process solution by dissolving an ester of glucomannan solely or together with a diluent in a solvent at a concentration of 0.2–20% by weight, preferably 0.5–5% by weight, introducing this starting process solution into an aqueous medium with agitation so as to form liquid droplets of the starting process solution suspended in said aqueous medium, said solvent being a chlorinated hydrocarbon which is not miscible or is only scarcely miscible with said aqueous medium and having a boiling point lower than said aqueous medium, evaporating off the solvent contained in the liquid droplets to leave spherical beads of the glucomannan ester, saponifying the so obtained beads of glucomannan ester to convert them into beads of free glucomannan and subjecting this bead to a cross linking reaction by adding a cross linking agent in an amount of at least 0.5 part by weight of the cross linking agent per 1 part of the glucomannan beads.

DETAILED DESCRIPTION OF THE INVENTION

By the "glucomannan" as used in the specification of the present invention is meant a polysaccharide consisting, as the main constituents, of D-glucose and D-mannose. As a commercially available product, there may be employed adequately konjakmannan, which is obtained from the plant Amorphophalus konjak, though other products may of course be used.

The glucomannan beads according to the present invention are those obtained from such glucomannan products by incorporating therein a cross-linked structure by reaction with cross linking agent. They are suitable especially for use as a hydrophilic packing gel bed for gel filtration and gel chromatography.

For the cross linking agent, bifunctional compounds, such as, epichlorohydrin, diepoxybutane, tolylene diisocyanate, hexamethylene diisocyanate and so on, can be employed.

It is preferable to adjust the degree of swelling and the exclusion limit molecular weight of the spherical beads of cross-linked glucomannan according to the present invention by preparing them so as to exhibit a porous macrostructure. It is possible, altenatively or concurrently, to incorporate regulation of the degree of cross linking to adjust the swelling degree and the exclusion limit molecular weight.

The spherical beads of cross-linked glucomannan according to the present invention can be prepared as follows:

As the starting glucomannan, a commercially available glucomannan product as such or a refined product treated by dissolving a commercial product once in water and precipitating the glucomannan from this aqueous solution by an addition of a non-solvent, in which glucomannan is not soluble or is scarcely soluble, such as, ethyl alcohol, methyl alcohol or so on, may be employed. The starting glucomannan is swollen with a solvent, such as, formamide, dimethylformamide or the like, and thereto is added an acid to cause reaction to esterify the glucomannan using an esterification catalyst, such as, pyridine or so on. For the acid, those of organic or inorganic nature, such as acetic acid, acetic anhydride, propionic acid, butyric acid, nitric acid and so on may be employed. Two or more acids can be used to obtain a mixed ester. In the case of acids having free carboxyl groups, water is formed upon reaction with glucomannan, which may cause the molecular chain of glucomannan to tend to be broken down, so that it is preferable to install a means for dewatering. On the contrary, acid anhydride, such as acetic anhydride etc., does not form reaction water and is most advantageous. The esterification is incorporated in order to render the glucomannan once insoluble in water, so as to allow to form suspending particles of glucomannan. It is desirable to esterify most part, preferably more than 85%, especially more than 90% of the OH groups in the glucomannan.

The thus esterified glucomannan is then purified using acetone and so on. Here, if the esterification yield is not higher than 85%, the solubility of the mannan in acetone etc. will be lower, so that the rate of recovery becomes decreased. The esterified glucomannan is thereafter deposited by contacting it with water and is then dried sufficiently.

Then, the ester of glucomannan thus obtained is dissolved solely or together with a diluent in a solvent. For the solvent, it is necessary to employ those which have boiling points lower than the aqueous medium, as will be explained later on, and which are not miscible or are scarcely miscible with said aqueous medium. For the solvent, chlorinated hydrocarbons, for example, dichloromethane, chloroform, carbon tetrachloride and trichloroethylene, are employed in practice solely or in mixture. Chlorinated hydrocarbon solvents are suitable for this invention, because they offer sufficient solubility for glucomannan but are not miscible or are scarcely miscible with water.

The concentration of the solution of glucomannan ester prepared as above should be such that spherical beads will be formed after it is introduced into an aqueous medium and the beads may possess sufficient strength for use as a packing material for example, for gel chromatography and gel filtration, after the solvent has been removed by evaporation. The concentration may, in general, be from 0.2 to 20%, preferably from 0.5 to 5% and, in particular, from 0.5 to 2% by weight.

If the concentration of the glucomannan eater is less than 0.2% by weight, a fine precipitate in a flocky form will be formed and beads are not obtained. On the other hand, if it exceeds 20% by weight, the particle size will become excessively large and the particle will exhibit non-porous surface, what makes the product impossible to employ for a gel packing.

In preparing the above mentioned solution of the glucomannan ester, while it is possible to dissolve the ester solely in a solvent as explained above, it is preferble to employ an adequate diluent for facilitating the adjustment of the degree of swelling and the exclusion limit molecular weight.

The diluent is used in order to attain the adjustment of the degree of swelling and exclusion limit molecular weight by forming a porous macrostructure inside the bead, after the diluent has been removed from the bead to leave behind voids or pores. For the diluent, there can be used those which have boiling points higher than that of said solvent and which do not dissolve the glucomannan ester. Concrete examples therefor include tetrahydronaphthalene, decahydronaphthalene, ethyl benzene, diethyl benzene, methyl dodecanoate, methyl caproate, toluene, hexyl alcohol, heptyl alcohol and octyl alcohol.

If glucomannan is swollen preliminarily with formamide, especially tetrahydronaphthalene and decahydronaphthalene are chosen as the diluent to obtain preferable results.

The amount of the diluent to be added may be chosen in accordance with the contemplated degree of swelling and with the exclusion limit molecular weight to be aimed at. In the case of, for example, preparing a gel product having a degree of swelling of 3 and an exclusion limit molecular weight of over 1,000,000, the amount of diluent may be, as a rough measure, in the range of 100–1,000%, preferably from 100 to 500%, based on the weight of the weight of the glucomannan ester employed.

The starting process solution containing the ester of glucomannan according to the present invention is prepared as described above.

The starting process solution is then introduced into an aqueous medium, in order to cause formation of spherical liquid droplets of the process solution suspended in the aqueous medium as the precursor of the beads of glucomannan ester.

As the aqueous medium, water or an aqueous solution containing a hydrophilic protective colloid, such as, partially hydrolyzed polyvinyl acetate, polyvinyl alcohol, carboxymethyl cellulose, ethylcellulose, methylcellulose, soluble starch, gelatin and so on.

The use of, above all, partially hydrolyzed polyvinyl acetate and polyvinyl alcohol as the protective colloid is preferable, since they dissolve quite well in water even at lower temperature and, in addition, reveal the ability for dispersing particles and a viscosity increasing effect more easily as compared with other ones.

The protective colloid may preferably be employed in a form of an aqueous solution of a concentration of 0.1–10% by weight, preferably 0.3–5% by weight.

A concentration of protective colloid lower than 0.1% by weight will tend to form glucomannan particles having an excessively large particle size and concentrations outside the range of from 0.1 to 10% by weight tend to produce glucomannan particles of not spherical form.

The aqueous medium may preferably be used at least in the same volume and preferably in an amount of 2-20 times of the volume of the glucomannan ester solution.

The starting process solution is introduced into the aqueous medium all at once, followed by agitation to disperse to form a suspension or, it may be introduced into the aqueous medium held in an agitated state all at once or dropwise to form a suspension. The intensity of agitation is so regulated that the average bead size of the final product will be from 1 to 500 μm.

Upon introduction of the starting solution into the aqueous medium, the glucomannan ester will be dispersed and suspended finely in the aqueous medium, since esterified glucomannan is insoluble in water. Here, evaporation of the solvent starts concurrently with the formation of beads. In this manner, spherical beads of glucomannan ester from which the solvent has substantially been evaporated off will finally be obtained.

For the temperature for evaporating off the organic solvent in the liquid droplets, a temperature above the freezing point of the aqeous medium and below the boiling point of the organic solvent is employed. Here, a temperature which is lower than the boiling point of the organic solvent, in particular by 1°-15° C., is preferred, in order to keep the spherical form of the beads in a better manner and to facilitate the evaporation of the organic solvent.

During the process step for evaporating off the organic solvent from the liquid droplets, the aqueous medium is held under agitation so as to maintain the spherical form of the liquid droplets. After the organic solvent contained in the liquid droplet has been evaporated off, a spherical bead will be left behind.

The beads are formed in a gel state and contain internally the diluent within a pumice-like porous matrix and can hold their shape of beads after they have been taken out of the aqueous medium. The diluent contained in the beads of glucomannan ester will be removed partly in this process step and is removed completely in the subsequent process step of saponification.

The spherical beads of glucomannan ester are then subjected to a saponification after they have been taken out of the aqueous medium. The saponification is effected for restoring the water soluble nature by re-conversion into free glucomannan. Here, substantially all the esterified glucomannan is saponified. It is necessary to employ a saponification bath which permits saponification to be effected without causing any harmful effect to the spherical form of the glucomannan ester beads, which have their water-solubility restored after the re-conversion into free glucomannan. As the saponification bath, for instance, an alcohol solution of alkali hydroxide, such as a methanol solution of sodium hydroxide or potassium hydroxide, an aqueous solution of alkali hydroxide, such as an aqueous solution of sodium or potassium hydroxide dissolved in an aqueous solution of salts such as sodium sulfate etc., may be used.

One concrete manner of effecting the saponification consists in that spherical beads of a glucomannan ester are soaked in an amount of methanol, which may amount to 5-10 times of the weight of the beads in accordance with each particular requirement, for 0.1-2 hours. The thus soaked beads are then introduced into a saponification bath of a mixture, which consists of an alcohol, such as, methanol etc., and of an aqueous solution of sodium hydroxide in a weight ratio of [alcohol]: [aqueous solution] of [9~7]: [1~3] and has a concentration of 0.1-5N NaOH, in such an amount that the ratio of [glucomannan]: [NaOH] is 1: [0.5~10] on the weight basis, and the mixture is agitated at room temperature for 10-24 hours to effect the saponification. Here, the sodium hydroxide solution may be incorporated by adding it dropwise so as to reach finally said range. If the concentration of NaOH of the bath is lower than 0.1N, the saponification does not proceed sufficiently and, on the other hand, if it exceeds 5N, cracks may occur in the beads. If the content of the alcohol is outside of the above mentioned range, undesirable phenomena, such as, elution or leakage of the saponified glucomannan and abnormal progress of saponification and so on, may appear.

During this saponification step, the glucomannan ester in the beads is saponified and the diluent contained in the beads will be extracted into the alcohol, leaving behind many voids or pores inside the bead to form a porous macrostructure.

One concrete manner of effecting the saponification with an aqueous alkali solution consists in that the spherical beads of glucomannan ester are introduced into an aqueous solution prepared by dissolving sodium hydroxide or potassium hydroxide in an aqueous solution of sodium sulfate and the mixture is agitated for 24 hours at room temperature.

The concentration of the alkali hydroxide in this aqueous solution is 10-15% by weight and the amount of the alkali hydroxide may be over 50%, based on the amount of the glucomannan ester. The amount of sodium sulfate employed may be in the range of 20 to 30%, based on the total weight of aqueous solution.

Among the concrete manners of saponification described above, the use of alcohol/aq. NaOH mixture may be more preferable for the reason that it achieves simultaneous elution or removal of the residual diluent and so on.

The thus obtained beads of glucomannan which have their water-solubility restored by the saponification are then contacted with a cross linking agent explained previously. The cross linking agent will penetrate into the inside of the spherical bead of glucomannan to realize cross linking of the glucomannan molecules with each other. The cross linking agent is employed in a form of a solution in an organic solvent.

As the organic solvent for the cross linking agent, there may be employed kerosene or liquid paraffin or a mixture of them (for example, in a volume ratio of 7:3) with addition of a surface active agent (a non-ionic surfactant, such as, sorbitan fatty acid ester) in an amount of 1-2% by weight. Another example of the solvent for the cross linking agent consists of a mixture of acetone with dimethyl sulfoxide (with a volume ratio of, for example, 6:4).

The concentration of the solution of cross linking agent may be at least 0.01 mole per liter of the cross linking solution and preferably is in the range from 0.01 to 15 moles per liter of the cross linking solution.

The cross linking of glucomannan in the spherical beads is attained by introducing 1-5 parts by weight of the glucomannan beads into 100 parts by weight of the solution of cross linking agent and agitating the mixture at room temperature for 24-36 hours. The thus cross-linked spherical beads of glucomannan are then filtered off and rinsed with acetone and washed then using a neutral surfactant, followed by water wash.

If the amount of cross linking agent used is less than the above mentioned value, the stability against pressure will become inferior.

The porous spherical beads of glucomannan thus obtained according to the present invention are easy in handling and are insoluble both in water and in aqueous alkaline or acid solution and are robust in the strength exhibiting high resistance to compression on packing in a column in an aqueous medium.

The beads of cross-linked glucomannan according to the present invention exhibit a degree of swelling in the range from 1.5 to 15, preferably in the range of 2–10. If the degree of swelling is less than 1.5, the amount of retention water becomes very small and the beads can not be used for the gel packing in practice. If, on the other hand, it exceeds the value of 15, the mechanical strength of the beads will be decreased considerably, so that the pressure stability to be attained in accordance with the present invention will not be obtained any more.

The beads of the present invention exibit a wide spectrum of the exclusion limit molecular weight and thus make it possible to adjust it in a range quite wider as compared with other hydrophilic gels, such as, from 200 to 100,000,000. In particular, the spherical beads of higher exclusion limit molecular weights according to the present invention reveal quite higher resistance to pressure, as compared with other gels.

By the exclusion limit molecular weight is meant such a limiting molecular weight that particles having molecular weights higher than this limit will not be capable of penetrating through the micropores of the packing material. This is represented in practice in terms of the molecular weight determined by the procedure in which a series of aqueous solutions of a certan high molecular weight substance, such as, dextran, polyethylene glycol etc., of various known molecular weights are passed through a column charged with a packing material to be tested, in order to observe each eluted amount using a differential refractometer, spectrophotometer or so on and the data observed are plotted on a graph with respect to the molecular weight of the substance observed and reading the molecular weight value at the break of the curve. Another property of the glucomannan gel of the present invention is that it has a matrix volume proportion of at least 15% at an exclusion limit molecular weight of about 1,000,000. Matrix volume proportion is the proportion of true volume of the gel substrate to the apparent volume of the bead.

The beads of the cross-linked glucomannan according to the present invention can be used as the packing material for gel filtration and gel chromatography, beside other uses, such as, for basic materials for ion exchangers, for packing material in affinity chromatography and for solid carrier for fixed enzyme etc., so that they are very useful in industry.

As already explained, the spherical beads of glucomannan can be prepared by the process according to the present invention under voluntary adjustment of their exclusion limit molecular weight over a quite wide range with superior resistance to compression.

PREFERRED EXAMPLES OF THE INVENTION

In the following, the present invention will be described by way of Examples, in which the degree of swelling and the amount of retained water of the gel, as given, were determined as follows:

The gel to be tested was charged in a 10 ml-measuring cylinder in an amount of about 2–3 ml and was maintained in a constant temperature bath at 40° C. for 4 hours, whereupon the volume V ml of the gel was read. Then, all of the gel in the measuring cylinder was transferred into a basket (with a tare weight of $W_1$ g) covered with a net of polyvinylidene chloride and the void water was removed by a centrifugal separator at 1,000 r.p.m. for 3 minutes and the basket was then weighed together with the gel contained therein (weight to $W_2$ g). The thus dewatered gel was dried in vacuum for 24 hours and was finely weighed together with the basket (weighed to $W_3$ g).

Degree of Swelling = $V/(W_3 - W_1)$

Amount of Retained Water = $(W_2 - W_3)/(W_3 - W_1)$

EXAMPLE 1

80 g of dried konjakmannan in a form of fine powder were charged in a 1 liter-three necked flask, a pretreatment liquid consisting of 240 g of acetic anhydride and 6 g of sulfuric acid was gradually dropped thereinto from a dropping funnel while agitating the mannan powder at room temperature, the temperature of the mixture was elevated to 60° C. and the agitation was continued for 50 hours. Then, the three necked flask was immersed in ice water to cool the contents and an acetylation liqor consisting of 480 g of acetic anhydride and 4 g of sulfuric acid was added dropwise thereinto while agitating. After the dropping had been finished, the mixture was stirred in a water bath at 60° C. for 2 hours, whereupon the mixture was dissolved in acetone and the solution was then poured into an ample amount of water to form a precipitate, which was filtered off under aspiration and was dried. 10 g were taken out of this filtered product and were dissolved in 150 ml of dichloromethane in a beaker. On the other hand, 6 g of a partially saponified (85%) polyvinyl acetate (referred to hereinafter as "polyvinyl alcohol") were dissolved in 600 ml of warm water at 50° C. in a 1 liter-beaker with stirring. This polyvinyl alcohol solution was cooled to normal temperature and the dichloromethane solution of the acetylated mannan as obtained above was dropped thereinto to form liquid droplets. The polyvinyl alcohol aqueous solution was then heated to 40° C. After 24 hours, before which the volatilization of dichloromethane had been finished, the solution was subjected to suction filtration to separate the spherical beads of acetylated glucomannan gel, which were then washed with water to remove the residual polyvinyl alcohol. All the beads thus obtained were transferred into a 500 ml beaker and the beads were treated by soaking them in methanol with subsequent decantation and this procedure was repeated three times in order to replace the water contained in the gel by methanol, whereupon the beads were further transferred into a 500 ml-three necked flask and thereto were added 270 ml of methanol. 30 ml of 10N aqueous sodium hydroxide were dropped thereinto gradually and the mixture was agitated at room temperature for 10 hours. Thereafter, the mixture was subjected to suction filtration to separate the gel and thus, the saponification was completed. The thus saponified gel was then introduced into 200 ml of kerosene containing 2% of a non-ionic surface active agent "ARLACEL 83" (Trade Mark of the firm, Kao Corp.) and thereto were dropped 30 g of epichlorohydrin at 40° C. with agitation. Then, the mixture was heated to 60° C. and stirred for 24 hours. The gel beads so obtained were washed with an aqueous solution of a neutral surfactant and then with water, whereby 5.5 g of gel beads of an average diameter in the range of from 50 to 200 μm were obtained. The exclusion limit molecular weight, the degree of swelling and the amount of retained water were observed to be 300, 2.3 and 0.9 respectively. The exclusion limit molecular weight was determined using a series of polyethylene oxide products as the standard.

EXAMPLE 2

A gel product was prepared by acetylation, granulation and saponification as in Example 1. The product was introduced into 200 ml of a liquid mixture consisting of dimethyl sulfoxide and acetone (with a volume ratio of 5:5) in a three necked flask and thereto were dropped 8 g of epichlorohydrin at 40° C. with agitation. Then, the mixture was further agitated at 60° C. for 24 hours, whereby 5.2 g of cross-linked mannan gel beads of an average diameter in the range of from 5 to 200 μm were obtained after water wash. The exclusion limit molecular weight, degree of swelling and amount of retained water of this gel product were determined to be 2,000, 6.2 and 5.2 respectively. The determination of the exclusion limit molecular weight was carried out as in Example 1.

EXAMPLE 3

4.0 g of konjakmannan powder were added to 4 liters of deionized water and were dissolved at 60°-70° C. with agitation. This solution was poured into 6 liters of ethanol dropwise to form a precipitate, which was then filtered off and dried in air and then in vacuum at 20° C. 30 g of this dried mannan powder were added to 1 liter of formamide and caused to swell for 2 days and thereto were then added 300 ml of pyridine and 150 ml of acetic anhydride and the reaction was continued at 50° C. for 5 days. The reaction mixture was poured into 7 liters of water with agitation and the precipitate formed was filtered off and washed with water. The precipitate was dried in air and further in vacuum. 3 g of the so dried product were dissolved together with 6 g of tetrahydronaphthalene in 300 ml of chloroform.

The so obtained solution was dropped into 3 liters of 2% aqueous solution of polyvinyl alcohol at 57° C. and, after 24 hours, the mixture was gradually cooled, whereupon the spherical beads formed were filtered and washed with water. The beads were then introduced into 270 ml of methanol and 30 ml of 10N solution of NaOH and the mixture was maintained under agitation for 24 hours to effect saponification and removal of the diluent. The saponified spherical beads were filtered off and were introduced into a cross linking agent bath prepared by mixing 35 g of epichlorohydrin into 300 ml of a mixed solution of acetone and dimethyl sulfoxide (1:1) and were treated at 60° C. for 24 hours. The exclusion limit molecular weight, the degree of swelling, the average bead size and the amount of retained water of the so obtained spherical beads were found to be 2,000,000, 5.1, 50-200 μm and 2.5 respectively.

Using the beads of glucomannan obtained as above (Gel A) and, as a comparison product, a commercial conventional packing material for gel filtration "Sepharose 4B" (Trade Mark; a product of the firm Pharmacia Fine Chemicals with an exclusion limit molecular weight of 3,000,000 (Gel B)], pressure tests were carried out.

The tests were performed in such a manner that a metal column having an inner diameter of 0.4 cm and a length of 15 cm was filled with the gel sample and water was flowed through this column using a high pressure pump and the variation of the pressure upon alteration of the flow rate was observed.

Figure 1:
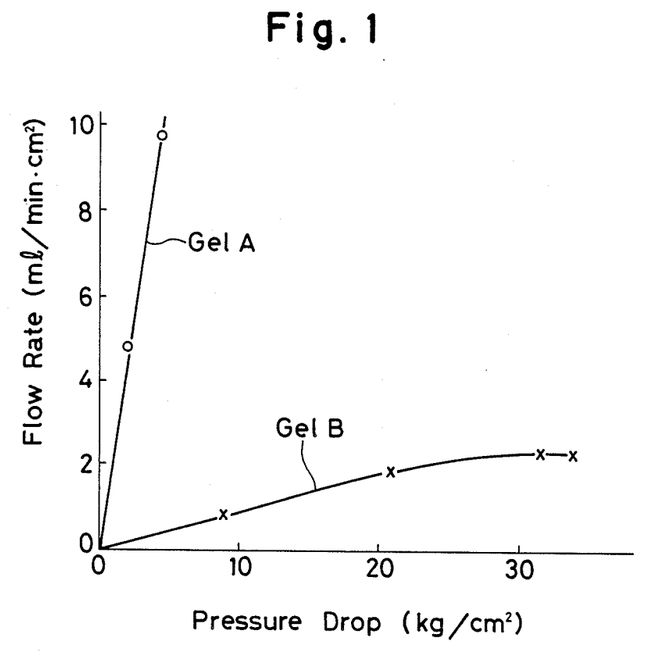
The drawing is a graph showing the relationship between the flow rate and the pressure drop upon flowing water through a column packed with Gel A or Gel B as described in Example 3.

Results were given in the graph of the drawing. As is clear from the graph, Gel A according to the present invention revealed a far higher pressure stability as compared with the prior product (Gel B) which have nearly the same exclusion limit molecular weight.

EXAMPLE 4

In the same manner as in Example 3, a konjakmannan powder was treated by acetylation, precipitation and drying. 3 g of the so treated mannan powder were dissolved together with 15 ml of diethylbenzene in chloroform. The bead formation and the saponification were effected as in Example 3. The so obtained saponified spherical beads were suspended in a cross linking agent bath prepared by adding 53 g of epichlorohydrin to 300 ml of a mixed solvent of acetone and dimethyl sulfoxide (1:4) and were treated at 60° C. for 24 hours. The exclusion limit molecular weight, the degree of swelling, the average bead size and the amount of retained water of the so obtained cross-linked beads were determined to be 100,000,000, 5.2, 50-200 μm and 5.8 respectively.

What is claimed is:

1. Glucomannan beads produced from glucomannan esters for use for gel filtration and gel chromatography, which are porous and have a cross-linked structure and exhibit a degree of swelling in the range from 2 to 8 ml of wet gel bed per g of dry gel, an exclusion limit molecular weight in the range from 1,000,000 to 100,000,000, and an average bead size in the range from 1 to 500 μm and a matrix volume proportion of at least 15% at an exclusion limit molecular weight of about 1,000,000, wherein matrix volume proportion is the proportion of true volume of glucomannan substrate to the apparent volume of the glucomannan bead.

2. Glucomannan beads according to claim 1, wherein the cross linking has been effected using a bifunctional cross linking agent.

3. Glucomannan beads according to claim 2, wherein the cross linking agent is a compound selected from the group consisting of epichlorohydrin, diepoxybutane, tolylene diisocyanate and hexamethylene diisocyanate.

4. A process for the production of porous glucomannan beads having an average size in the range from 1 to 500 μm, a cross-linked structure and a matrix volume proportion of at least 15% at an exclusion limit molecular weight of about 1,000,000, wherein matrix volume proportion is the proportion of true volume of glucomannan substrate to the apparent volume of the glucomannan bead, comprising preparing a starting process solution by dissolving an ester of glucomannan together with a diluent, in a chlorinated hydrocarbon solvent so that the concentration of said glucomannan ester in said process solution is from 0.2 to 20% by weight; adding said starting process solution to an aqueous medium, said chlorinated hydrocarbon solvent having a boiling point lower than that of said aqueous medium and being not miscible or scarcely miscible with said aqueous medium, and agitating the mixture to form a suspension of liquid droplets having an average size of 1 to 500 μm of said starting process solution suspended in said aqueous medium; evaporating off said chlorinated hydrocarbon solvent contained in the liquid droplets to leave sphericl beads of the glucomannan ester; saponifying the thus-formed beads of the glucomannan ester and effecting cross-linking of the thus-saponified beads by adding thereto a cross-linking agent in an amount of at least 0.5 part by weight per 1 part by weight of the glucomannan beads.

5. A process according to claim 4, wherein the solvent consists of one or more compounds selected from the group consisting of dichloromethane, chloroform, carbon tetrachloride and trichloroethylene.

6. A process according to claim 4, wherein the diluent consists of one or more compounds selected from the group consisting of tetrahydronaphthalene, decahydronaphthalene, ethyl benzne, diethyl benzene, methyl dodecanoate, methyl caproate, toluene, hexyl alcohol, heptyl alcohol and octyl alcohol.

7. A process according to claim 4, wherein the ester of glucomannan is obtained by reacting glucomannan with acetic anhydride.

8. A process according to claim 4, wherein the glucomannan which has preliminarily been swollen with formamide is subjected to formation of liquid droplets together with a diluent selected from the group consisting of tetrahydronaphthalene and decahydronaphthalene.

9. A process according to claim 4, wherein the aqueous medium contains a partially saponified polyvinyl acetate as a protective colloid in an amount of 0.5–5% by weight.

10. A process according to claim 4, wherein the aqueous medium is heated to a temperature from 1° to 15° C. lower than the boiling point of the organic solvent to accelerate evaporation of the organic solvent from the liquid droplets.

11. Porous beads consisting of a gel of cross-linked glucomannan produced from glucomannan ester, said beads having a degree of swelling in the range of from 2 to 8, wherein degree of swelling=V/W in which V is the volume, in milliliters, of a bed of said porous beads which has been saturated with water, and W is the weight, in grams, of said bed after same has been dried to remove said water, said beads having an exclusion limit molecular weight of from 1,000,000 to 100,000,000 wherein exclusion limit molecular weight is the maximum molecular weight of particles which can penetrate through the pores of said beads, said beads having an average bead size in the range of 1 to 500 micrometers, said beads being insoluble in water, in an aqueous alkaline solution and in an aqueous acid solution, and said beads additionally having a matrix volume proportion of at least 15% at an exclusion limit molecular weight of about 1,000,000, wherein the matrix volume proportion is the proportion of true volume of glucomannan substrate to apparent volume of the glucomannan bead.

* * * * *

UNITED STATES PATENT AND TRADEMARK OFFICE
CERTIFICATE OF CORRECTION

PATENT NO. : 4 882 426

DATED : November 21, 1989

INVENTOR(S) : Yoshiaki MOTOZATO

It is certified that error appears in the above-identified patent and that said Letters Patent is hereby corrected as shown below:

The title page should be deleted to appear as per attached title page.

Signed and Sealed this

Twenty-seventh Day of October, 1992

Attest:

DOUGLAS B. COMER

Attesting Officer     Acting Commissioner of Patents and Trademarks

United States Patent [19]

Motozato

[11] Patent Number: 4,882,426

[45] Date of Patent: Nov. 21, 1989

[54] BEADS OF CROSS-LINKED GLUCOMANNAN AND PRODUCTION THEREOF

[75] Inventor: Yoshiaki Motozato, Kumamoto, Japan

[73] Assignee: Kurita Water Industries, Ltd., Tokyo, Japan

[21] Appl. No.: 70,950

[22] Filed: Jul. 8, 1987

[51] Int. Cl.$^4$ .................. A61K 29/02; C09K 3/00
[52] U.S. Cl. ............................ 536/114; 536/126
[58] Field of Search ............ 527/300, 301; 536/114, 536/126

[56] References Cited

U.S. PATENT DOCUMENTS

| | | | |
|---|---|---|---|
| 3,265,631 | 8/1966 | Jordan | 536/114 |
| 4,115,536 | 9/1978 | Rothman et al. | 424/9 |
| 4,124,705 | 11/1978 | Rothman et al. | 536/120 |
| 4,514,309 | 4/1985 | Wadhwa | 524/44 |

OTHER PUBLICATIONS

Journal of Chromatography, vol. 355, No. 2, Mar. 21st, 1986, pp. 434–437, Elsevier Science Publishers B.V., Amsterdam, NL; Y. Motozato et al, "Preparation and gel permeation chromatographic properties of pullulan spheres".
Polymer Preprints, Japan, vol. 36, No. 3, 1987, p. 876; Y. Motozato et al, "Macroporous glucomannan spheres for the size separation of aqueous macromolecules".
Patent Abstracts of Japan, vol. 6, No. 139 (C-116)[1017], Jul. 28th, 1982; & JP-A-57 63303 (Yoshiaki Motozato) 16-04-1982.
Patent Abstracts of Japan, vol. 6, No. 180 (C-125)[1058], Sep. 14th 1982; & JP-A-57 98506 (Yoshiaki Motozato) 18-06-1982.

*Primary Examiner*—John Kight
*Assistant Examiner*—Nathan M. Nutter
*Attorney, Agent, or Firm*—Flynn, Thiel, Boutell & Tanis

[57] ABSTRACT

Beads product of Glucomannan having a cross-linked structure and exhibiting a degree of swelling of in the range from 1.5 to 15, an exclusion limit molecular weight in the range from 200 to 100,000,000 and an average bead diameter in the range from 1 to 500 μm. The glucomannan beads are useful for packing material for gel filtration and for gel chromatography. They can be produced by a process which comprises preparing a starting process solution by dissolving an esterified glucomannan solely or together with a diluent in a solvent, introducing this starting process solution into an aqueous medium so as to cause formation of liquid droplets of the starting process solution suspended in said aqueous medium, evaporating off the solvent contained in the liquid droplets to leave spherical beads of the glucomannan ester, saponifying the so formed beads of glucomannan ester to convert into beads of glucomannan and effecting then cross linking of the saponified beads by reacting with a cross linking agent.

11 Claims, 1 Drawing Sheet

UNITED STATES PATENT AND TRADEMARK OFFICE
CERTIFICATE OF CORRECTION

PATENT NO. : 4 882 426
DATED : November 21, 1989
INVENTOR(S) : Yoshiaki MOTOZATO It is certified that error appears in the above-identified patent and that said Letters Patent is hereby corrected as shown below:

On the title page, item [73], change the assignee to read as follows:

---Kurita Water Industries, Ltd., Tokyo, Japan and Yoshiaki Motozato, Kumamoto-shi, Kumamoto, Japan---.

Signed and Sealed this

Third Day of May, 1994

*Attest:*

BRUCE LEHMAN

*Attesting Officer*  *Commissioner of Patents and Trademarks*